UNITED STATES PATENT OFFICE.

JOSEPH A. WEST, OF MIERTOWN, INDIANA.

PAINT.

936,203.  Specification of Letters Patent.  Patented Oct. 5, 1909.

No Drawing.  Application filed April 12, 1909.  Serial No. 489,401.

*To all whom it may concern:*

Be it known that I, JOSEPH A. WEST, a citizen of the United States, residing at Miertown, in the county of Grant and State of Indiana, have invented a new and useful Paint, of which the following is a specification.

It is the object of the present invention to provide a paint designed chiefly for use in painting bridges, roofs, and like structures which are exposed to the elements and which will effectually protect the structure from the elements.

The invention further aims to provide a paint of the character stated which, when it dries, will not be brittle but on the other hand will be flexible and elastic to such degree as to positively insure against "chipping".

The paint embodying the invention is of course impervious to water so that wood structures will be protected against rotting and iron structures against rust, and it is one object of the present invention to embody in the composition of the paint, a substance which will impart thereto a metallic luster and color or appearance without detracting from the water-proof properties of the paint.

In compounding the paint embodying the present invention, the following ingredients are intimately mixed in the proportions stated:

| | |
|---|---|
| Coal-tar | 1 barrel. |
| Oxid of iron | 15 pounds. |
| Slate | 15 pounds. |
| Chipped rubber | 20 pounds. |
| Asbestos | 10 pounds. |
| Gasolene | 5 gallons. |
| Asphaltum | 5 gallons. |
| Cement | 50 pounds. |
| Turpentine | 5 gallons. |

After these ingredients have been thoroughly mixed, the mixture is thinned to the required fluidity by the addition thereto of a sufficient quantity of gasolene, this quantity being of course added in addition to that introduced at the time of mixing the ingredients. It will be understood of course that the oxid of iron employed in compounding the paint is the ferric oxid commonly known as ocher and that this ingredient serves the purpose of a pigment, the slate, which prior to mixing with the other ingredients, is ground to a fine powder, being also incorporated to impart the required color to the finished product, this ingredient further imparting a glazed appearance to the paint when applied and dry.

The coal tar renders the paint water-proof and also imparts thereto a certain degree of flexibility and elasticity which, owing to its admixture with certain other of the ingredients of the compound, is retained or apparent even after the paint has dried although only to such degree as will effectually obviate cracking or chipping of the paint. The chipped rubber, preferably in the nature of granules, also imparts flexibility and elasticity to the finished product and the asbestos to a certain degree renders the structure upon which the paint is applied fire-proof and being of a fibrous nature, acts as a binder whereby to hold the particles of rubber, cement, and slate, in a state of combination. The asbestos furthermore, while acting as a binder and also serving the useful function of a fire-proofing ingredient, if anything, adds to the flexibility of the paint and renders the same less liable to crack and chip, owing chiefly to its fibrous nature. The gasolene employed of course acts as a solvent and also as a quick drier for the paint in addition to rendering the paint sufficiently fluid for application to a structure, and the asphaltum adds to the water-proof properties of the paint while the turpentine is provided as a vehicle and also to retard the drying of the paint to the proper degree. The cement of course possesses substantially the same properties as the slate.

From the foregoing description of the paint embodied in the present invention, it will be understood that the same will render a structure to which it is applied, water-proof, fire-proof to a certain degree, and that the paint will not become hard and brittle although it will thoroughly dry, it retaining a certain flexibility and elasticity which obviates chipping and cracking. The paint is applied in the same manner as any ordinary paint and should it become too inspissated for use, it may be readily thinned by the addition of gasolene. It will be understood, of course, that in place of the oxid of iron and the slate, other pigment may be equally as well employed although these pigments are preferable in that they will impart to the paint a metallic or slate-like appearance and are well adapted to withstand the elements.

What is claimed is:—

A paint embodying in its composition coal tar, oxid of iron, slate, chipped rubber, asbestos, gasolene, asphaltum, cement, and turpentine in about the proportions of coal tar one barrel, oxid of iron fifteen pounds, slate, fifteen pounds, chipped rubber, twenty pounds, asbestos, ten pounds, gasolene, five gallons, asphaltum, five gallons, cement, fifty pounds, and turpentine, five gallons.

In testimony that I claim the foregoing as my own, I have hereto affixed my signature in the presence of two witnesses.

JOSEPH A. WEST.

Witnesses:
S. T. HOLLINGSWORTH,
M. C. COBLE.